United States Patent
Kilibarda et al.

(10) Patent No.: US 9,581,983 B2
(45) Date of Patent: Feb. 28, 2017

(54) METHODS FOR USING AN AUTOMATED GUIDED CART

(71) Applicant: Comau LLC, Southfield, MI (US)

(72) Inventors: Velibor Kilibarda, Southfield, MI (US); William J. Maybee, Southfield, MI (US)

(73) Assignee: COMAU LLC, Southfield, MI (US)

( * ) Notice: Subject to any disclaimer, the term of this patent is extended or adjusted under 35 U.S.C. 154(b) by 885 days.

(21) Appl. No.: 13/903,527

(22) Filed: May 28, 2013

(65) Prior Publication Data

US 2013/0325159 A1 Dec. 5, 2013

Related U.S. Application Data

(60) Provisional application No. 61/652,571, filed on May 29, 2012.

(51) Int. Cl.

| | |
|---|---|
| *G05B 11/01* | (2006.01) |
| *B21D 39/03* | (2006.01) |
| *B23P 11/00* | (2006.01) |
| *G05B 15/02* | (2006.01) |
| *G05D 1/02* | (2006.01) |
| *G05B 19/418* | (2006.01) |
| *B23K 37/047* | (2006.01) |

(52) U.S. Cl.
CPC ......... *G05B 15/02* (2013.01); *G05B 19/4189* (2013.01); *G05B 19/41895* (2013.01); *G05D 1/0225* (2013.01); *B23K 37/047* (2013.01); *G05B 2219/31002* (2013.01); *Y02P 90/285* (2015.11)

(58) Field of Classification Search
USPC .................................. 29/429–430; 700/17–20
See application file for complete search history.

(56) References Cited

U.S. PATENT DOCUMENTS 4,815,190 A * 3/1989 Haba, Jr. ............... B23P 21/004
198/346.1
5,091,855 A 2/1992 Umehara et al.
5,272,805 A 12/1993 Akeel et al.
(Continued)

FOREIGN PATENT DOCUMENTS

GB 2231687 A 11/1990

OTHER PUBLICATIONS

Comua Guided Cart CGC PowerPoint Dated Apr. 5, 2012.
(Continued)

*Primary Examiner* — Ronald Hartman, Jr.

(57) ABSTRACT

An automated guided cart (AGC) that is configured to travel along a cart path according to generally non-precision movements is implemented to support a build process requiring precise positioning of vehicle build devices. In an example of a method of use, a vehicle build device for the build process is engaged with the AGC. When the AGC travels proximate a build operation area, the AGC can be secured in a dimensionally fixed position, with the result that both the AGC and a vehicle build device engaged with the AGC are located in precise positions. Based on the precise location of the vehicle build device, the vehicle build device can be interfaced with robots or other automated equipment according to preprogrammed and/or precise movements to carry out a build process.

21 Claims, 8 Drawing Sheets

(56) References Cited

U.S. PATENT DOCUMENTS

| | | | |
|---|---|---|---|
| 6,278,905 B1 | 8/2001 | Saito | |
| 7,416,130 B2 | 8/2008 | Kilibarda | |
| 8,201,723 B2 | 6/2012 | Kilibarda | |
| 8,869,370 B2* | 10/2014 | Kilibarda | B23P 19/001 29/430 |
| 9,014,902 B1* | 4/2015 | Murphy | G05D 1/0295 701/26 |
| 2005/0073767 A1 | 4/2005 | Goodman | |
| 2009/0285666 A1 | 11/2009 | Kilibarda | |
| 2011/0209321 A1* | 9/2011 | Kilibarda | G06Q 10/06 29/426.1 |
| 2011/0314665 A1* | 12/2011 | Kilibarda | B23P 19/001 29/783 |
| 2012/0304446 A1 | 12/2012 | Kilibarda | |
| 2013/0184849 A1* | 7/2013 | Chan | G06Q 10/08 700/113 |

OTHER PUBLICATIONS

International Search Report and Written Opinion of the International Searching Authority, or the Declaration dated Jun. 20, 2014.
Chinese Office Action dated May 5, 2016 in corresponding U.S. Appl. No. 13/903,527, English Translation.

* cited by examiner

METHODS FOR USING AN AUTOMATED GUIDED CART

CROSS REFERENCE TO RELATED APPLICATIONS

This application claims priority benefit to U.S. Provisional Patent Application No. 61/652,571 filed May 29, 2012, which is incorporated herein by reference in its entirety.

TECHNICAL FIELD

The present invention is generally in the field of manufacturing and assembly of vehicles.

BACKGROUND

Conventional vehicular assembly plants have employed programmable automated guided vehicles (AGVs) for moving parts and equipment. Conventional AGVs are versatile and capable, but they are complex and expensive for predetermined tasks and predetermined point-to-point movements.

Automated or automatic guided carts (AGCs) have been employed in facilities where less complex, low precision tasks, such as pushing and pulling loads on a semi-predefined and permanent path to a general area, is established. In these configurations and applications, AGCs have offered a less expensive, but limited use for applications requiring low precision positional location of the cargo or components being transported. The conventional non-precise locating capabilities rendered use of AGCs unsuitable for many applications where the robots which interact with the parts were programmed for precise operations requiring components and subassemblies to be positioned with a high level of precision.

It would be advantageous to configure and employ lower cost AGC's to perform precision movements in methods and processes, for example movement of assembly fixtures, tooling and/or components along a precision vehicle subassembly and main assembly lines, to increase efficiency and lower vehicle assembly costs in a high production facility.

BRIEF SUMMARY

The present invention includes methods of using at least one automated guided cart (AGC) for engaging and/or transferring one of a plurality of different vehicle build devices. The AGC can be precision adapted for engaging vehicle build components, or alternatively, can be adapted for precision engagement to a transfer cart, a holding fixture, a tooling fixture or other support structures for the vehicle build components. The AGC can be moved along one of a plurality of fixed and predetermined respective paths, and temporarily secured at precision locations in machine manufacturing and assembly facilities where vehicle build components are consumed. Also, a plurality of AGCs may be used to respectively engage and/or transfer a plurality of different vehicle build components or respective support structures along respective fixed and predetermined paths of travel to precision locations in machine manufacturing and assembly facilities.

In one example, the AGC can be used to support a build process that requires precise positioning of vehicle build components. In this example, the AGC is placed in communication with a guide path device, which defines a path for the AGC to follow to an assembly cell that includes a robot or other automated equipment configured to interface with a vehicle build component during a build process. At a predetermined or sequenced time (e.g., prior to, during or after movement to the assembly cell), the AGC is be precisely engaged with a vehicle build component, subassembly, tooling, fixture or other vehicle build device used during the build process, either directly or indirectly using a support structure.

In operation, the AGC travels along the path according to generally non-precision movement. When the AGC is at the assembly cell, it is secured in a dimensionally fixed position, such that both the AGC and the vehicle build component engaged with the AGC are located in precise positions. With the vehicle build component at a precise position, the robot or other automated equipment of the assembly cell can interface with the vehicle build component according to preprogrammed and/or precise movements to carry out a build process utilizing the vehicle build component.

In one variation, a docking station can be implemented proximate the assembly cell to locationally position the AGC. The docking station may, for example, include location rollers configured to progressively engage with locator pads of the AGC to locationally position the AGC in all three dimensions with respect to path followed by the AGC.

Other examples and variations of the above described and illustrated below known by those skilled in the art may be used.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Several examples of automated guided carts (AGCs) and methods of use are disclosed in FIGS. 1-12.

Figure 1:
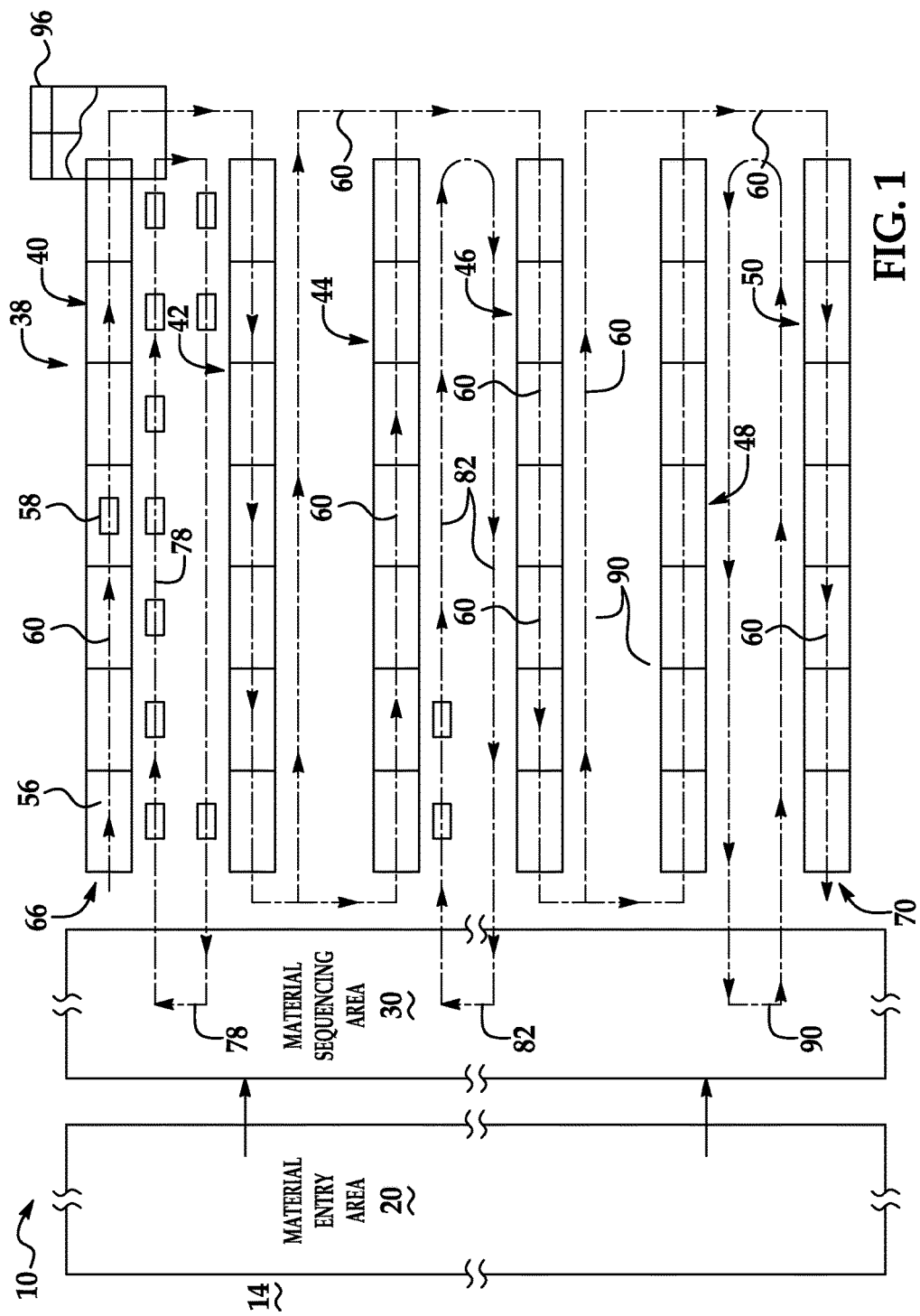
FIG. 1 is a schematic of an example of an assembly facility useable with the present invention.
Figure 2:
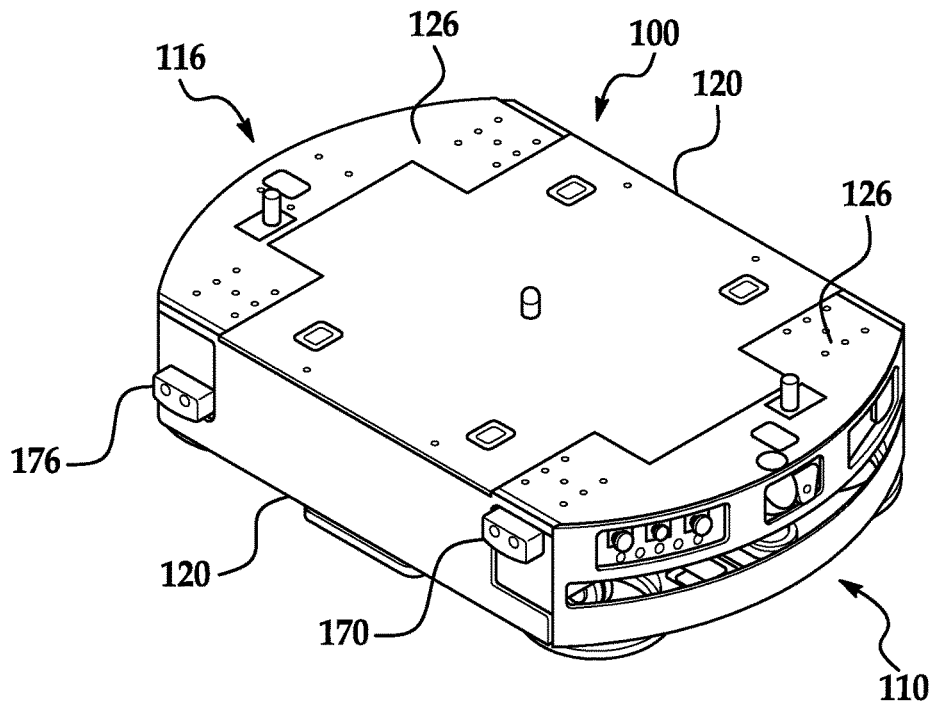
FIG. 2 is a perspective view of an example of an automated guided cart (AGC) useable with the inventive methods.
Figure 3:
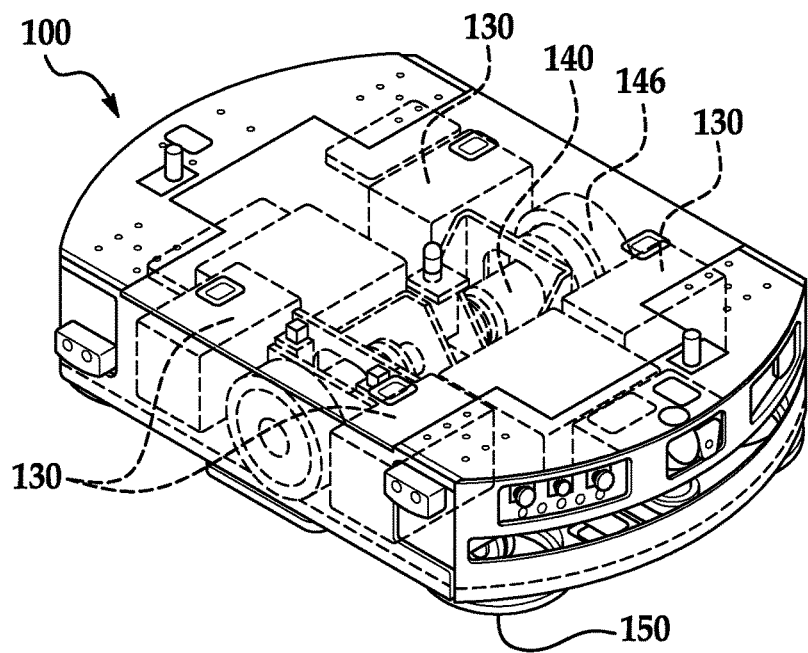
FIG. 3 is a cutaway view of the example AGC in FIG. 2.
Figure 4:
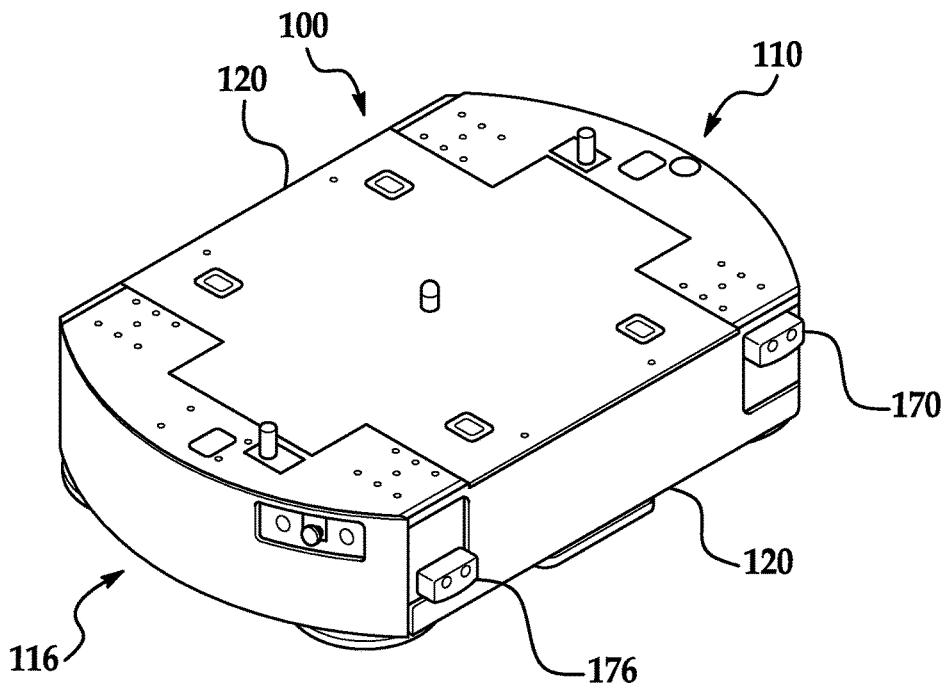
FIG. 4 is an alternate perspective view of the example AGC in FIG. 2.
Figure 5:
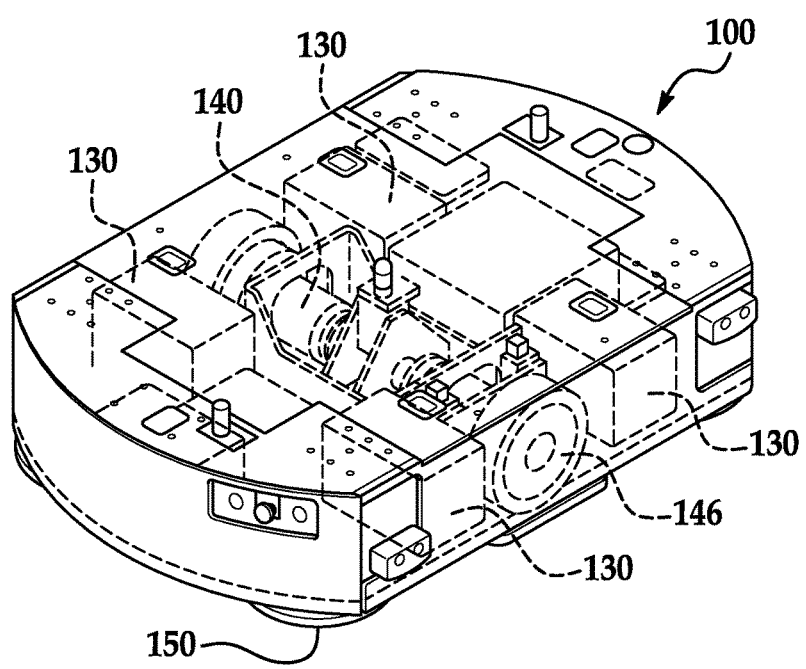
FIG. 5 is a cutaway view of the example AGC in FIG. 4.

Examples of methods of use of AGCs 100 are described with reference to a vehicle assembly plant illustrated in FIG. 1 having a part delivery system 10 and an exemplary floor plan 14. In the example, the system 10 is used for assembling body-in-white (BIW) vehicle body structures 58 in various stages of assembly. It is understood that other applications for the methods of use may be used in many other manufacturing and assembly operations, for example powertrain and final assembly, for vehicles or other devices, as known by those skilled in the art.

In the example, the system 10 includes a material entry area 20, a material sequencing or staging area 30, and a plurality of main assembly lines 38 (six shown and identified as 40, 42, 44, 46, 48, 50). Each assembly line 38 includes a vehicle travel path 60 running down each line 40-50. In the example shown, there is an assembly line starting position 66 and an ending position 70 with path 60 having generally a serpentine path selectively through assembly lines 40-50 as generally shown. Other assembly line 38 configurations, orientations and vehicle paths 60 known by those skilled in the art may be used.

In one example, material entry area 20 is a large area in the assembly plant floor 14 used for the organization and storage of individual components or subassemblies of components (not shown) which are to be assembled and connected together at selected assembly cells or build stations 56 (seven stations for each line 38 shown) at the assembly lines 38 to produce a product or part, for example, an automotive vehicle body 58. Other structures, methods, features, configurations and functions of the exemplary plant floor 14 useable with the system 10 are disclosed and illustrated in U.S. patent application Ser. Nos. 13/151,684 and 13/483,156 assigned to the assignee of the present invention and incorporated herein by reference. It is contemplated that an assembly plant facility may have separate areas where tooling/fixtures, vehicle components or subassemblies are built or stored. In addition to build components and tooling/fixtures that need to be transported from one plant area to another, other plant equipment such as maintenance components, maintenance equipment and devices known by those skilled in the art may also need to be transported to other areas in the facility where they are needed. It is further possible to have such parts or equipment stored adjacent to the assembly lines or assembly cells as in conventional assembly plants. Other plant configurations and logistics known by those skilled in the art may be used with the present invention.

Referring to FIGS. 2-6, an example of an automated guided cart (AGC) 100 for use with the inventive processes and methods, is illustrated. In the example, guided cart 100 includes a body 100 having a front 110, rear 116, sides 120 and top surface 126 having access panels 128. As best seen in FIGS. 2-5, guided cart includes a power source 130, preferably a rechargeable battery pack, one or more drive motors 140 to power drive wheels 146, omni-directional castors 150 and a scanner 154 to detect objects in the path of the guided cart when in motion. The guided cart 100 further includes a processing unit, memory, controller and other electronic devices (illustrated, but not specifically identified) known by those skilled in the art to operate as an AGC to accomplish the features and functions described herein.

Guided cart 100 further includes a guidance system, preferably in the form of a sensor which detects one of a plurality of cart guide path devices 134 preferably secured to plant floor 14 along a predetermined path of travel, for example 60 or 78, discussed further below. The cart guide path device 134 may be in the form of tape, paint, wire or combinations such as paint or tape over magnetic tape. Other path devices known by those skilled in the art may be used. In operation, when the cart 100 is equipped, programmed and activated, the sensor tracks and follows the guide path device 134 thereby defining the predetermined and fixed path of travel for the cart 100, until a new cart path is desired and implemented in the manner above for the cart 100.

In a preferred guided cart 100 for use in precision component assembly locating operations, cart 100 includes a plurality of precision-located hole arrays 160 (in top surface 126) each having at least one, and preferably several, precision threaded holes 164 through the cart body, and most preferably the top surface 126 as generally shown (four arrays shown adjacent the corners of the cart). The holes 164 are designed to be precisely and accurately located in three-dimensional space (x, y and z coordinate directions) relative to other portions of the cart 100, for example first 170 and second 176 locator pads. Holes 164 are preferably threaded with common machine threads or may take other forms for positive connection of other fasteners or devices to suit the particular application. Precision holes or hole arrays 160 may be on other areas of the cart 100 as well (bottom, sides, ends). In alternate examples, the precision holes may be in the form of other attachment points such as precision located pins, bosses, hooks, eyes or other engagement or locating devices (not shown) known by those skilled in the art.

Figure 6:
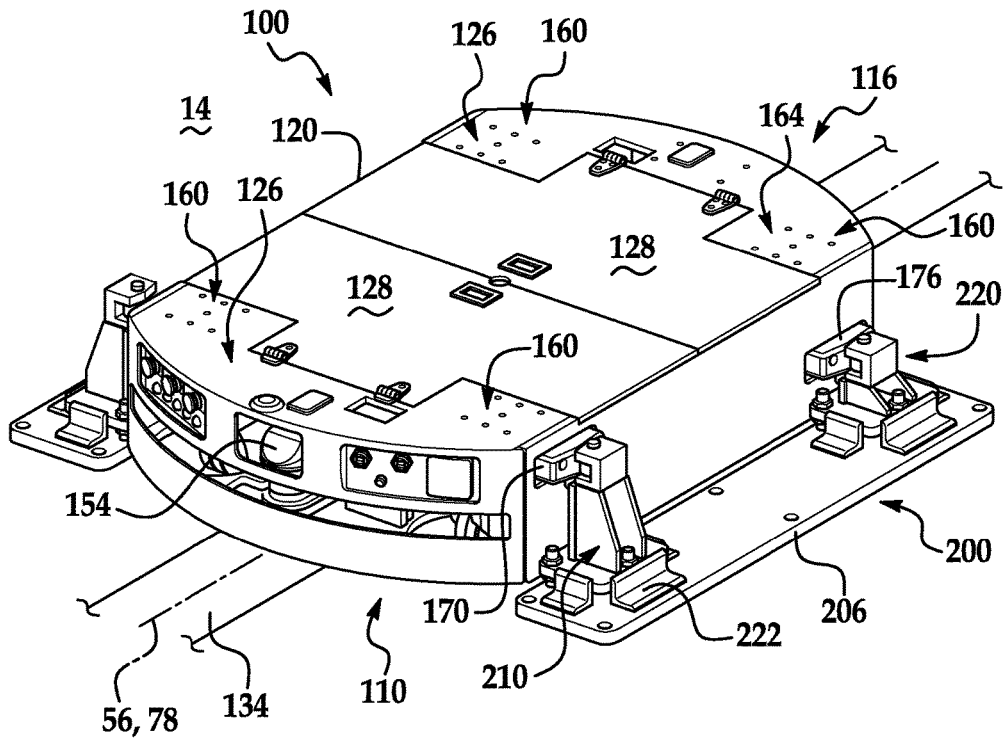
FIG. 6 is perspective view of an example AGC in use with an example of a precision docking station useable with the present invention.
Figure 7:
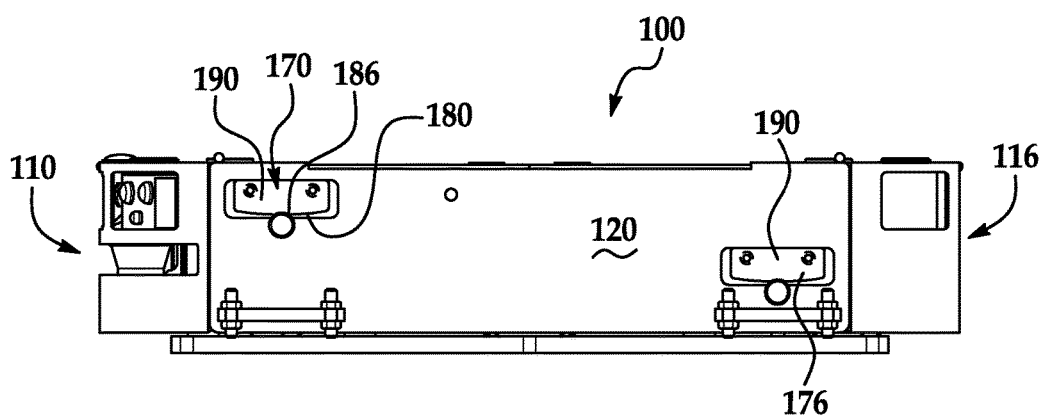
FIG. 7 is a left side view of the AGC shown in FIG. 6 with portions of the docking station cutaway for ease of illustration.

The exemplary guided cart 100 includes the first 170 and second 176 locator pads on each side 120 as best seen in FIGS. 6 and 7. In the example, first locator pad 170 is positioned toward the cart front 110 at a higher elevation than the second locator pad 176 positioned toward the rear 116. In the example pads, each pad 170, 176 includes a first locating surface 180 positioned toward floor 14 and a second locating surface 190 which may generally vertical or parallel to sides 120. In a preferred example, first locating surface 180 has an arcuate shape with leading and trailing edges angled downward toward a center detent position 186 as further described below. Locating pads 170 and 176 may further include precision holes or other areas (not shown) on the first 180 or second 190 locating surfaces for precision location of fasteners, attachment or other accessories to cart 100.

As with the hole arrays 160, the position and orientation of the pads 170 and 176 are precision located relative to the rest of the cart 100 and particularly to the hole arrays 160 and individual holes 164. The precision location of pads 170 and 176 may be established by including additional precision holes or hole arrays (not shown) similar to hole arrays 160 so that the pads 160 can be locationally positioned to close dimensional tolerances to the cart or other features of the cart, for example hole arrays 160. Other shapes, configurations and numbers of locator pads 170 and 176 to suit the particular application or specification may be used. Locator pads 170 and 176 may further be oriented and positioned in different locations on cart body 106 other than the sides 120 as illustrated.

Figure 8:
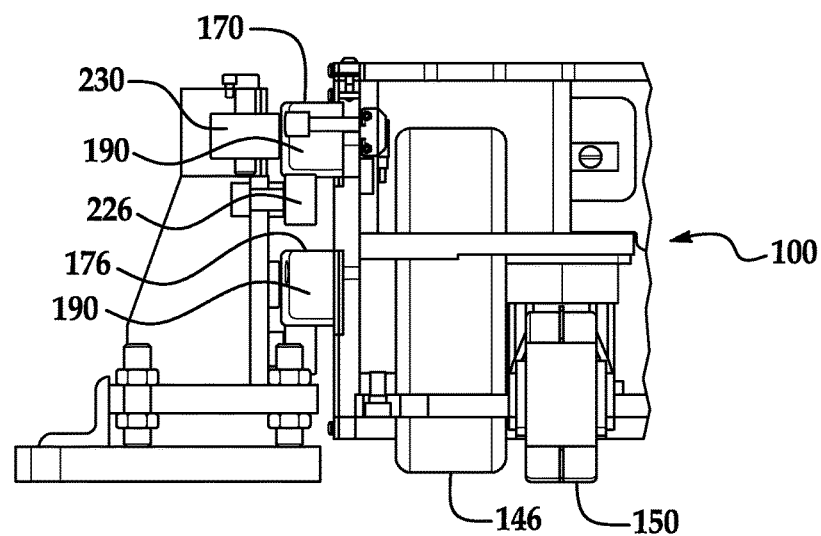
FIG. 8 is a partial end view of the AGC shown in FIG. 6, illustrating the method of docking the AGC with the docking station, with a portion of the AGC cutaway to illustrate a drive wheel.

Referring to FIGS. 6-8, in a preferred example of use for guided cart 100, a docking station 200 is used to temporarily secure the guided cart 100 in a firm, dimensionally fixed position while a precision assembly process is executed as further described below. In the example, docking station 200 includes a base 206, a first pillar 210, a second pillar 220 and a plurality of anchors 222 to dimensionally locate and reinforce the pillars from unwanted movement relative to the base. In a preferred example, base 206 is rigidly secured to plant floor 14. In a preferred example, base 206, pillars 210 and 220 are positioned in an assembly cell or build station 56 are precisely dimensionally located relative to the assembly cell and path of travel 60, 78 as further described below.

As best seen in FIGS. 7 and 8, each pillar 210 and 220 of the exemplary docking station 200 includes a precision vertical locating roller 230 on a vertical axis and a precision horizontal locating roller 226 on horizontal axis as generally shown. In the example, when a guided cart 100 enters a docking station, horizontal rollers 226 from the respective and opposing pairs of pillars 210 and 220 on either side of path 60, 78 contact the adjacent locating pad 170 and first locating surface 180 to locate and precisely position the cart 100 in the vertical (Z coordinate) direction. Vertical locating rollers 230 contact the locating pad second surfaces 190 to precisely position the cart 100 laterally (Y coordinate) direction. In one example, after sufficient progression of the rollers 226 along first locating surface 180, horizontal rollers 226 will lodge into the detent 186 thereby positively and precisely locating the cart 100 in the longitudinal direction along path 60, 78 (X coordinate) direction. The drive rollers 146 are compliantly mounted to the cart 100, so that they remain engaged with the floor 14 even when the horizontal rollers 226 slightly lift the cart 100 into a precise Z coordinate location. In this position, the drive motor driving the cart drive wheels 146 is temporarily stopped or disengaged until the predetermined assembly operation is completed as further discussed below. In this position, the precision hole arrays 160 are thereby precisely positioned relative to the docking station 200 and assembly cell 56 robots (or other plant equipment). Docking station 200 may be made from different components and configurations known by those skilled in the art.

In an exemplary use for AGC/guided cart 100, cart 100 is used to transport a plurality of different vehicle build components from one or more locations along a predetermined path defined by guide path device 134. The vehicle build components according to various examples could be vehicle component parts, vehicle subassemblies or partially assembled vehicle bodies, as described below. Due to the various features described and illustrated, for example the precision hole arrays 160, cart 100 can be easily and quickly configured to transport a desired payload for precise positioning in selected areas of an assembly facility.

Figure 9:
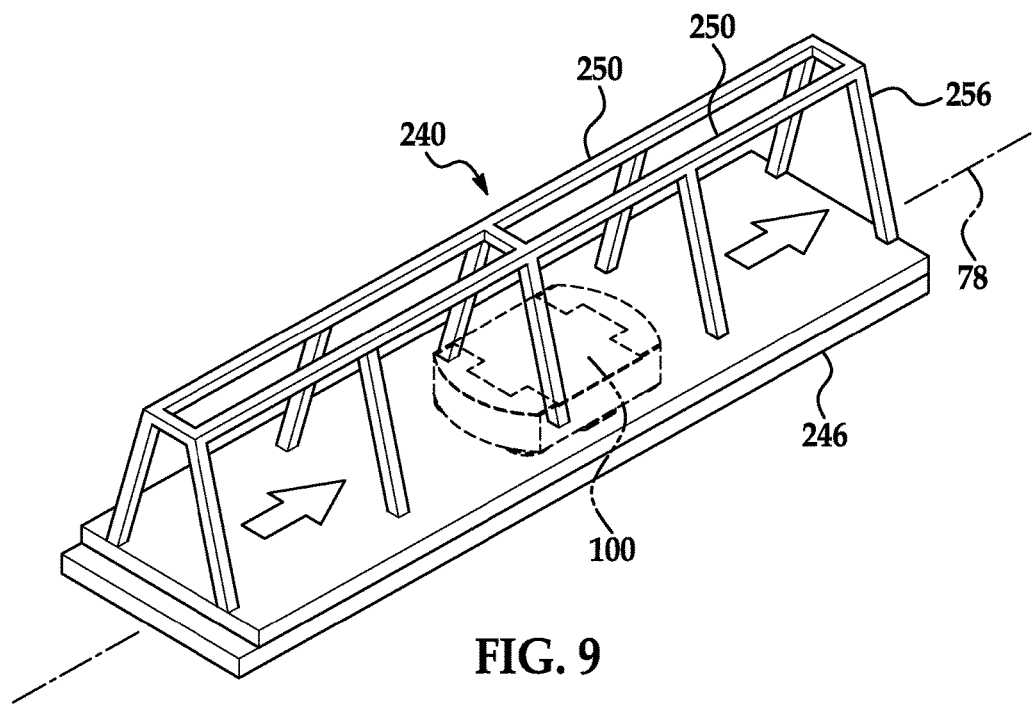
FIG. 9 is an example assembly component transfer cart useable with the present invention.

As shown in FIG. 9, in one example of use of cart 100, cart 100 is used to engage and transport a part or component transfer cart 240 along one or more assembly lines. FIG. 9 illustrates a cart 240 which is further described in patent application Ser. No. 13/151,684 assigned to the assignee of the present invention and incorporated herein by reference. In this example, cart 240 is loaded or stocked with selected vehicle build components (not shown) using support rails 250, 256. The selectively loaded components are then selectively removed from the carts by workers, robots or other devices and used to support a series of build stations or assembly cells along an assembly line, for example lines 40-50 in FIG. 1. One objective of the cart 240 is to stock it with vehicle build components specific to a type of vehicle to be built in a staging area of the facility and then sequence the carts according vehicle build schedule so the specific components for a vehicle are adjacent the assembly cells as that particular vehicle progresses along the assembly line and process.

In a preferred example of engagement or connection of cart 100 to cart 240, cart 100 may include one or more engagement pins fixed to the cart 100 relative to threaded holes 164 (not shown) selectively extending upward from top surface 126. These pins would be positioned and oriented in coordinated holes or openings in the underside of cart 240. On a predetermined position of the guided cart 100 relative to the part cart 240, the pins could be actuated to extend into the coordinating holes thereby locking the guided cart 100 to the part cart 240 for secure travel. Other methods of selective and temporary engagement of the cart 100 to component cart 240 known by those skilled in the art may be used. For example, guided cart 100 may have a coupler (not shown) positioned on the front 110 or rear 116 to push or pull the cart 240. Other methods of connecting guided cart 100 to component carts or other component carrying devices or fixtures known by those skilled in the art may be used. In one example of the inventive methods, the cart 100 method is able to achieve positional accuracy and/or precision of +/−0.5 millimeters (mm) versus conventional automated guided cart's accuracy of +/−5.0 mm.

In the example, a predetermined path of travel 78 (or 82 or 90) would first be designated using the guide path device 134. In one example of this application, cart 100 would be positioned to engage one cart 240 and thereafter transport the cart 240 along the path of travel 78 until the cart 240 is depleted of parts. In one example, cart 100 would temporarily stop at each assembly station 56 along path 60 while a particular build process is completed using the components transferred by the cart 240 and then move to the next station. If the particular assembly cell 56 or operation required precision location of the cart 100 and/or components thereon, a docking station 200 could be employed at the station. In one example, the path 78 would return the cart 100 to the material sequencing area 30 for the cart 240 to be reloaded with components before returning to the assembly lines 40-50.

Figure 10:
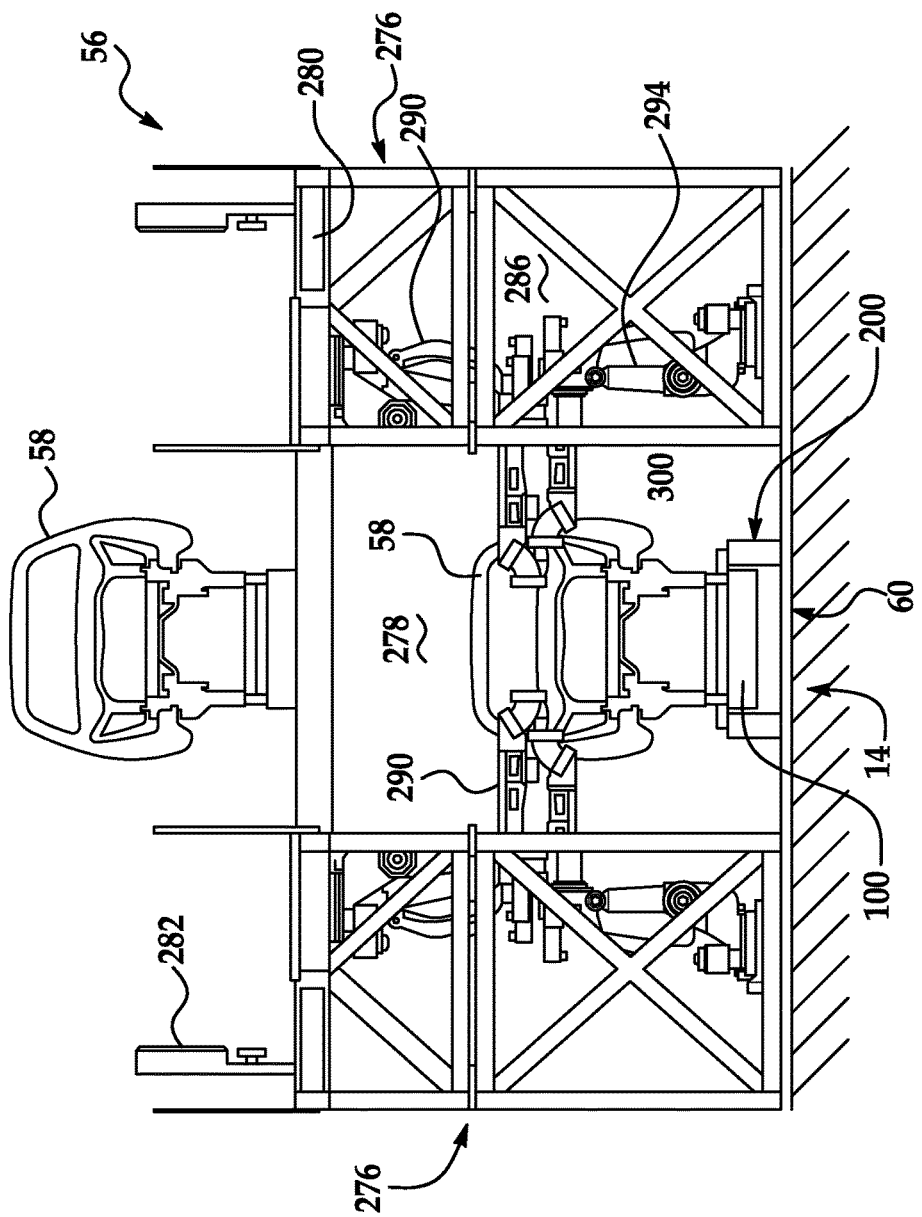
FIG. 10 is an end view of an example assembly cell useable with the present invention.

Referring to FIG. 10, another example of use for system 10 and guided cart 100 is illustrated. In the example, a vehicle sheet metal body or body-in-white (BIW) 58 is secured to cart 100 and transported through successive assembly cells 56 directly along the path of travel 60 through one or more of assembly lines 40-50. In conventional, high volume vehicle assembly lines, a system of parallel, floor-mounted powered rollers support a pallet which the body 58 is connected to is selectively moved down path 60 from station to station. The powered rollers, pallets and associated controls require a substantial amount of precision manufactured and installed infrastructure to support and guide the pallets and connected subassembly 58 through the assembly lines 40-50. One example of a pallet and power roller structure is found in U.S. Pat. No. 7,416,130 assigned to the assignee of the present invention and incorporated herein by reference.

In the example shown in FIG. 10, the flexibility of guided cart 100 to support and transport the subassembled body 58 without the powered roller infrastructure described above is illustrated. In one example, a minimal yet accurate infrastructure body or component holding fixture 300 is connected directly to the cart 100 by threaded bolts through several holes 164 in the precision hole arrays 160 to precisely position and secure body 58 to the cart 100. The subassembly or body 58 can then be positioned on the fixture 300 connected to the cart 100, for example fixed locating pins atop the fixture 300 through precision or datum holes (not shown) in the sheet metal in body 58. Other methods for connecting the body to fixture 300 and the fixture to 300 to the cart 100 known by those skilled in the art may be used.

Cart 100, through the predetermined and fixed path of travel defined by the path device 134, is guided along path 60 through the assembly cells as described. In the example illustrated in FIG. 10, assembly cell 56 includes a docking station 200 to positively and precisely locate the guided cart 100, and thereby body 58 (or other device to be built/assembled), relative to the assembly cell 56. In the example, assembly cell 56 includes a scaffolding structure 276 on either side of the assembly line 60 defining a work area 278 therebetween. Example cell 56 includes a top platform 280 defining a work space 286 in which one or more inverted robots 290 and upright robots 294 are positioned and operated to selectively access work area 278 and carryout predetermined assembly operations through controls 282 as generally shown. Further details of the assembly cell 56 are described and illustrated in U.S. patent application Ser. Nos. 12/262,722 and 12/269,955 assigned to the assignee of the present invention and incorporated herein by reference.

In an alternate example not shown, guided cart 100 may be used with a traditional pallet or other fixture or support structure which is used to support the illustrated partially assembled body 58 or other vehicle build component. The methods of use may also be employed with more sophisticated vehicle support pallets, for example that described in U.S. patent application Ser. No. 12/913,908 assigned to the assignee of the present invention and incorporated herein by reference. Guided cart 100 can be engaged to the pallet in one of the methods described for the component cart 240 in FIG. 9. Other forms of fixtures 300, from minimal or complex in structure, orientation and function to suit the particular application or performance specification, known by those skilled in the art may be used. An important advantage of using an AGC/guided cart 100 over conventional systems and conventional automated guided vehicles (AGVs) is the lower cost and complexity of the AGCs being guided by the guide path devices 134 versus the high level of control, complexity and costs associated infrastructure and costs of conventional AGVs.

Figure 11:
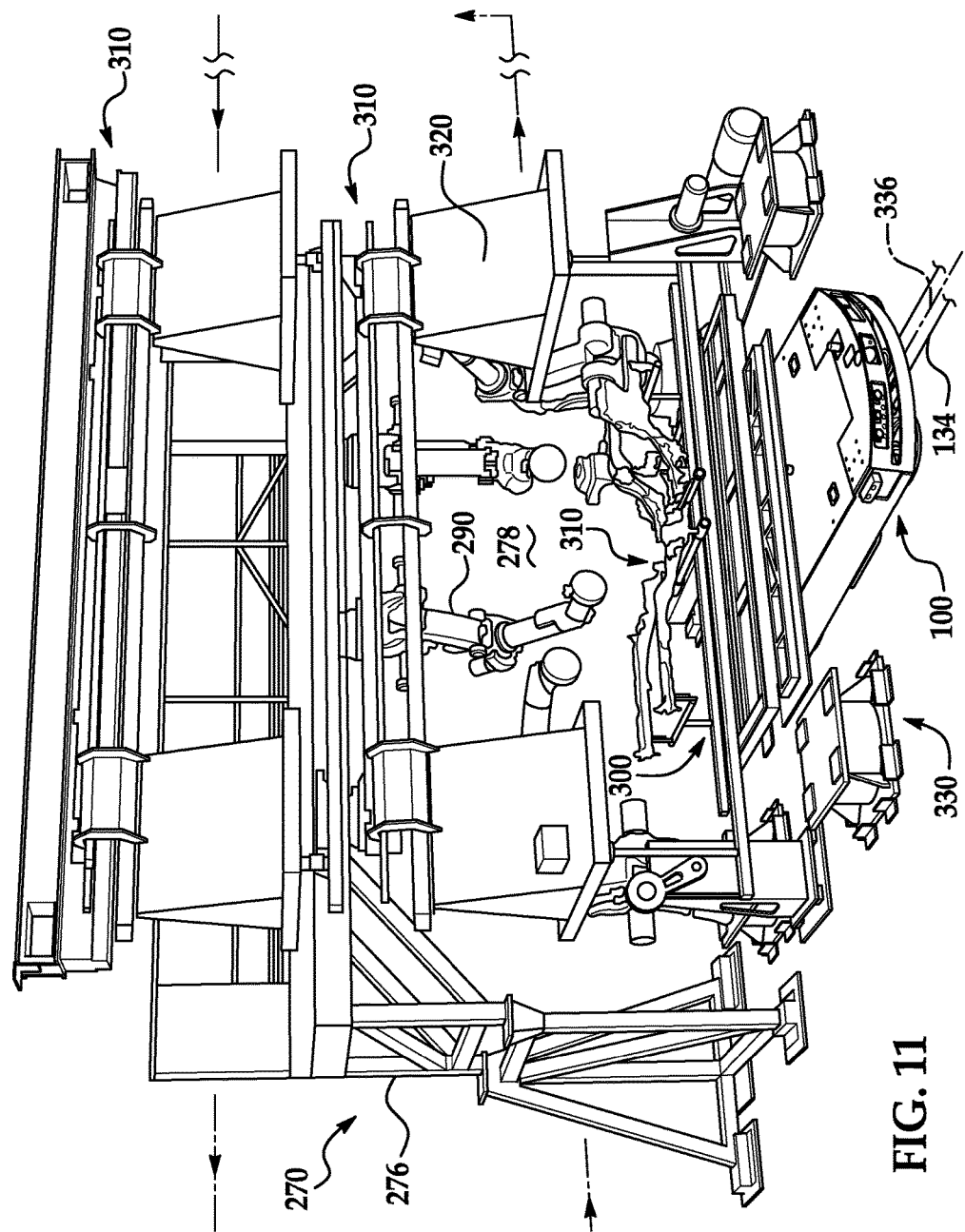
FIG. 11 is a perspective view of an example assembly cell and example tooling shuttle useable with the present invention.

In another example of use of AGC/guided cart 100 is shown in FIG. 11. In the example, an overhead conveyor system 310 is employed along one or more of the assembly lines 40-50 to progressively transfer and build subassemblies and bodies 58. In the example, similar assembly cell structures 270 described in FIG. 10 may be used. An example of this configured assembly cell is described and illustrated in U.S. patent application Ser. Nos. 12/262,722 and 13/483,156 assigned to the assignee of the present invention and incorporated herein by reference. In the example, a tooling shuttle 330 is used which selectively transfers different forms of tooling/fixtures 314, for example for different style vehicle bodies 58, into and out of the assembly cell 56 work area 278. Robots 290 remove individual components and subassemblies from component racks 320 and install and connect, for example through welding or adhesive, the components to progressively build the body 58. In a conventional assembly cell with the overhead conveyor 310, the tooling shuttle employed powered roller conveyors (not shown) similar in concept to the powered roller conveyors described in example 10.

In the present method of use for guided cart 100, cart 100 can connect the desired tooling 314 directly to the cart 100 through the precision hole arrays 160 or can employ varying levels of support holding fixtures, for example 300 described in FIG. 10, as necessary to suit the particular application and performance specification. In the example cart 100 is selectively moved along path 336 defined by guide device 134 to deliver the necessary tooling into and out of the work station for engaging vehicle build components or to support other predetermined build operations in the cell. In one example not shown, two carts 100 supporting alternate tooling are positioned on either side of work area 278 as generally described in U.S. patent application Ser. No. 12/262,722 assigned to the assignee of the present invention and incorporated herein by reference. In the example, one cart may be positioned on either side of the assembly cell with different tooling, for example different vehicle body styles. The respective carts 100 can them be reciprocated into and out of the assembly cell working area as needed to support the build. Alternately, one cart 100 may be used to reciprocate into and out of the cell engaging and disengaging the appropriate tooling or parts to support the build. It is understood that variations to the example uses described and alternate uses and processes for system 10 and cart 100 known by those skilled in the art may be used.

Figure 12:
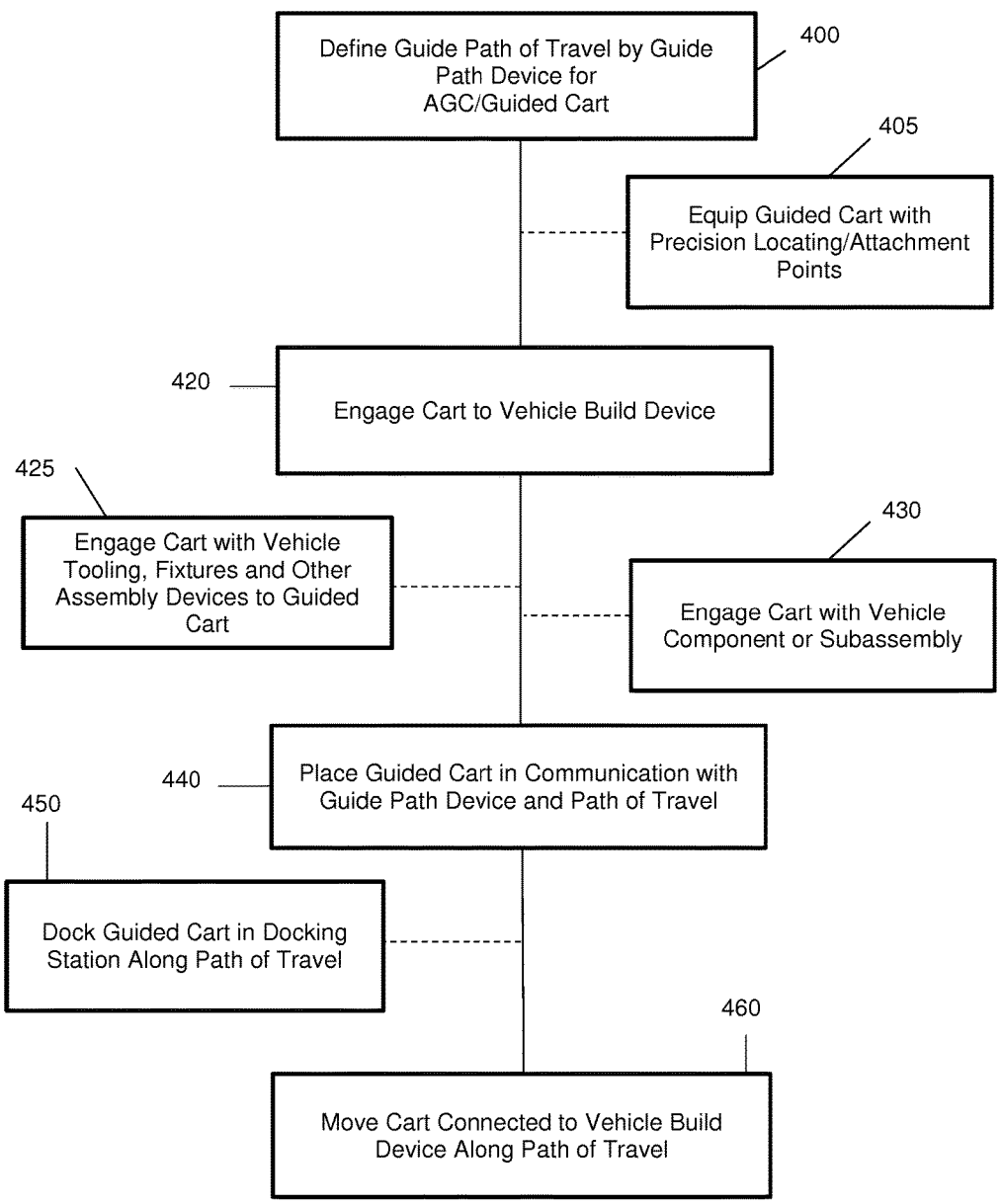
FIG. 12 is a schematic flow chart of an example method of use of the exemplary AGCs described herein.

Referring to FIG. 12, a schematic of exemplary methods of operation and use for system 10 and cart 100 is illustrated. In operation, method step or process step 400 includes defining a predetermined and fixed path of travel for cart 100. As described above, the fixed path may be defined through path device 134 (paint, tape, wire or other materials recognizable by the cart 100 sensor to guide cart 100 along the device 134).

In an alternate step 405, the guided cart is equipped with precision locating, engaging or mounting features, for example precision hole arrays 160 and/or locating pads 170 and 176 for further use in assembly cells and/or docking station 200 described above and used in the process described below.

In step 420, a cart 100 is equipped or configured to directly connect to, or temporarily engage through selected contact with a vehicle build device, e.g., a vehicle build component, subassembly, support rack, tooling/fixtures or other device that needs to be selectively transported from one location to another in a manufacturing facility. In a common application in alternate step 425, some form of a transfer cart 240, holding or positioning fixture 300 and/or tooling 310 may first be connected to cart 100 through precision hole arrays 160 or other ways as described above.

In an alternate step 430, cart 100 may be used to engage vehicle build components or subassemblies with or without devices in step 425 as described.

In step 440, the cart is placed in sensory communication with the guide path device 134 to position the guided cart on the predetermined path, for example 60 or 78 as described above.

In step 460 the guided cart 100 is powered and progressively transferred along the guide path device 134 to one or more assembly lines 40-50 and assembly cells 56 until the desired level of build for the body 58 or other predetermined operation is complete.

In an alternate step 450, where precision location of the component, subassembly, tooling/fixture, body 58 or other build device is required for a build or assembly operation, for example in an assembly cell 56, guide cart 100 is temporarily secured in a docking station 200 until the particular build operations for that assembly cell are complete. In this process step, with the guided cart and body 58 precisely located relative to an assembly cell 56 or other equipment, highly efficient assembly devices, for example industrial robots 290 and 294 can interact and carryout precision build processes in a work area while reducing or eliminating substantial assembly plant infrastructure previously necessary to deliver components, subassemblies and/or bodies 58 to assembly cells along an assembly line.

It is understood that additional steps, or changes in the order of the method steps described above, known by those skilled in the art may be used without deviating from the present invention.

It is further understood that the above devices and methods have been described and illustrated as progressively assembling the sheet metal portion of a transportation vehicle, the devices and processes are equally applicable to other areas and processes associated with the assembly of transportation vehicles, for example, powertrain, interior, exterior and final assembly. The devices and processes are further useful in the manufacture and assembly of other parts, products devices and machines beyond transportation vehicles.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for precisely transporting and positioning vehicle build devices in a manufacturing assembly line using an automated guided cart (AGC), the method comprising the steps of:
   defining a cart path with a guide path device, the cart path including a first location proximate a build operation area;
   placing an AGC in communication with the guide path device;
   engaging at least one vehicle build device with the AGC;
   supporting a vehicle component by the vehicle build device;
   selectively and automatically moving the AGC along the cart path to the first location through sensing of the guide path device by a sensor connected to the AGC in communication with a memory device having programmed instructions, a processor and a drive device; and
   stopping the AGC in the first location thereby precisely dimensionally positioning the vehicle component at the first location without further movement of the vehicle component relative to the vehicle build device.

2. A method for supporting an automated build operation with vehicle build devices, the method comprising the steps of:
   defining a cart path with a guide path device, the cart path including a first location proximate a build operation area;
   placing an AGC in communication with the guide path device;
   engaging at least one vehicle build device with the AGC;
   selectively and automatically moving the AGC along the cart path through sensing of the guide path device by a sensor connected to the AGC to the first location;
   docking the AGC at the first location, the docking operable to precisely dimensionally position the AGC at the first location, and to temporarily secure the AGC in a dimensionally fixed position to thereby precisely position the vehicle build device engaged with the AGC; and
   interfacing automated equipment with the vehicle build device while the AGC is docked at the first location based on the precise positioning of the vehicle build device.

3. The method of claim 2 wherein the step of engaging at least one vehicle build device with the AGC comprises:
   engaging the AGC with a pallet for supporting at least one of vehicle build components and subassemblies.

4. The method of claim 3 wherein the pallet is in the form of a component transfer cart, the step of engaging a support pallet comprises:
   engaging a transfer cart having a plurality of build components specific to a vehicle type; and
   sequentially moving the AGC and engaged build component cart along the guide path in substantially coordinated movement with a vehicle body traveling along the assembly line.

5. The method of claim 4 further comprising the step of:
   sequentially removing build components from the component cart at predetermined locations and times in a vehicle build sequence.

6. The method of claim 3 wherein the pallet is in the form of a vehicle body support fixture, the step of engaging a support pallet comprises:
   positioning the cart guide path directly on the assembly line path of travel;
   engaging a vehicle body support fixture for supporting a partially assembled vehicle body; and
   moving the vehicle body directly along the assembly line path of travel directly through at least one assembly cell.

7. The method of claim 2 wherein the step of securing the AGC in a dimensionally fixed position at the first location further comprises:
   engaging at least two locator pads positioned on opposing sides of and extending from the AGC with one or more locating rollers positioned on pillars positioned on opposing sides of the guide path.

8. The method of claim 7 wherein the step of engaging the locator pads further comprises the steps of:
   engaging the locator pad of the AGC with a vertical locating roller of the docking station to precisely position the AGC in a horizontal (y) direction;
   engaging the locator pad of the AGC with a horizontal locating roller of the docking station to precisely position the AGC in a vertical (z) direction; and
   engaging the horizontal locating roller of the docking station within a detent defined by the locator pad of the AGC to temporarily secure the position the AGC in a longitudinal (x) direction along the cart path.

9. The method of claim 2 wherein the vehicle build device is at least one of a vehicle component part, a vehicle component subassembly, a component holding fixture or a component rack.

10. A method for precisely transporting and positioning vehicle build devices in a manufacturing assembly line using an automated guided cart (AGC), the method comprising the steps of:
    defining a cart path with a guide path device, the cart path including a predetermined first location proximate a build operation area;
    placing an AGC in communication with the guide path device;
    engaging a pallet for supporting a vehicle build component or subassembly with the AGC;

selectively and automatically moving the AGC along the cart path through sensing of the guide path device by a sensor connected to the AGC to the predetermined first location; and stopping the AGC in the predetermined first location and precisely dimensionally positioning the vehicle build component or subassembly at the predetermined first location.

11. The method of claim 10 wherein the pallet is in the form of a component transfer cart, the step of engaging a support pallet comprises:

engaging a transfer cart having a plurality of build components specific to a vehicle type; and sequentially moving the AGC and engaged build component cart along the guide path in substantially coordinated movement with a vehicle body traveling along the assembly line.

12. The method of claim 11 further comprising the step of:

sequentially removing build components from the transfer cart at predetermined locations and times in a vehicle build sequence.

13. The method of claim 10 wherein the pallet is in the form of a vehicle body support fixture, the step of engaging a support pallet comprises:

positioning the cart guide path directly on the assembly line path of travel;

engaging a vehicle body support fixture for supporting a partially assembled vehicle body; and moving the vehicle body directly along the assembly line path of travel directly through at least one assembly cell.

14. A method for precisely transporting and positioning vehicle build devices in a manufacturing assembly line using an automated guided cart (AGC), the method comprising the steps of:

defining a cart path with a guide path device, the cart path including a first location proximate a build operation area;

placing an AGC in communication with the guide path device;

engaging at least one vehicle build device with the AGC;

selectively and automatically moving the AGC along the cart path through sensing of the guide path device by a sensor connected to the AGC to the first location; and stopping the AGC in the first location and precisely dimensionally positioning the vehicle build device at the first location.

15. The method of claim 14 wherein the step of precisely positioning the vehicle build device at the first location further comprises the step of:

mounting a docking station at the first location; and engaging the AGC with the docking station thereby precisely dimensionally positioning the vehicle build device with respect to the first location.

16. The method of claim 15 further comprising the steps of:

temporarily securing the AGC in a dimensionally fixed position at the first location through the AGC engagement with the docking station.

17. The method of claim 16 wherein the step of securing the AGC in a dimensionally fixed position at the first location further comprises:

engaging at least two locator pads positioned on opposing sides of and extending from the AGC with one or more locating rollers positioned on pillars positioned on opposing sides of the guide path.

18. The method of claim 17 wherein the step of engaging the locator pads further comprises the steps of:

engaging the locator pad of the AGC with a vertical locating roller of the docking station to precisely position the AGC in a horizontal (y) direction; and engaging the locator pad of the AGC with a horizontal locating roller of the docking station to precisely position the AGC in a vertical (z) direction.

19. The method of claim 18 wherein the step of engaging the locator pads further comprises the steps of:

engaging the horizontal locating roller of the docking station within a detent defined by the locator pad of the AGC to temporarily secure the position the AGC in a longitudinal (x) direction along the cart path.

20. The method of claim 14 wherein the step of precisely positioning the vehicle build device at the first location further comprises the steps of:

defining a plurality of dimensionally precision attachment points on an exterior of the AGG; and engaging the vehicle build device at the precision attachment points thereby precisely dimensionally positioning the vehicle build device relative to the AGC.

21. The method of claim 14 wherein the vehicle build device is at least one of a vehicle component part, a vehicle component subassembly, a component holding fixture or a component rack.

* * * * *